May 25, 1954  K. M. SFORZA DEL PESARO  2,679,364
CONVERTIBLE AIRCRAFT
Filed Dec. 29, 1950  3 Sheets-Sheet 1

INVENTOR.
KASIMIR MARTINI SFORZA DEL PESARO

INVENTOR.
KASIMIR MARTINI SFORZA DEL PESARO

FIG. A.
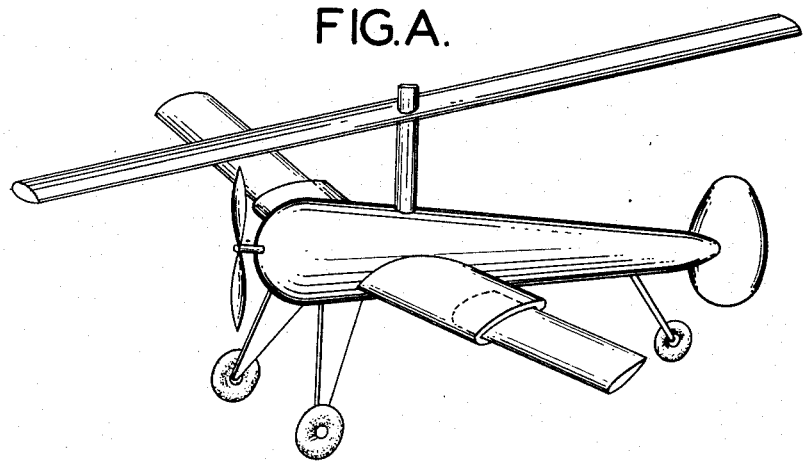
FIG. Ba.
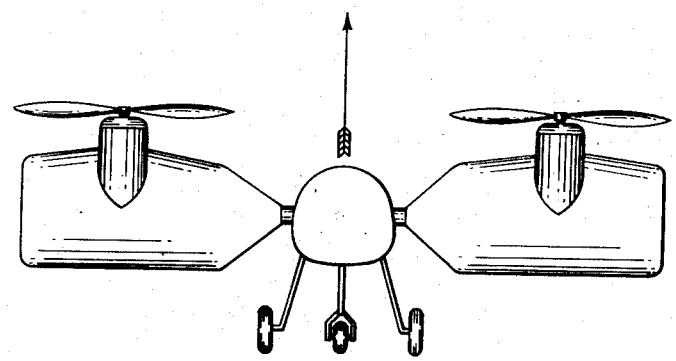
FIG. Bb.
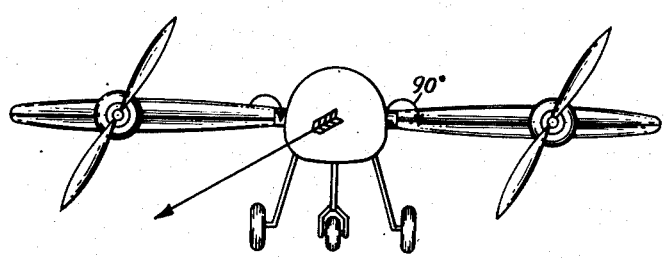
INVENTOR
KASIMIR MARTINI SFORZA DEL PESARO Patented May 25, 1954

2,679,364

UNITED STATES PATENT OFFICE 2,679,364

CONVERTIBLE AIRCRAFT

Kasimir Martini Sforza del Pesaro, Bronxville, N. Y., assignor to Jet Helicopter Corporation, New York, N. Y., a corporation of Delaware Application December 29, 1950, Serial No. 203,433

4 Claims. (Cl. 244—7)

1. As is well known, the airplane needs a large space to take off as well as to land. Also, the airplane cannot move sideways nor backwards; however, it has a high speed in horizontal direction.

2. On the other hand, the ordinary helicopters do not require a large space as the airplanes do, and can move in any direction, yet these moves are too slow due to their present constructions. Their horizontal direction of flight is obtained at present by tilting of the rotor plane (rotor disc) independently of the rest of the helicopter body in the required direction of the flight.

The horizontal component of such tilting angle pulls the craft in direction of this component (ahead, backwards and/or sideways). Due to the small angle of the above tilting (otherwise the helicopter will fall down, losing its vertical component), such horizontal component can be very small (about 10% of its vertical component which should, in the nature of the things, be larger than the total weight of the helicopter), and therefore the speed of helicopters in the horizontal directions, up to now, does not exceed 110 M. P. H.

3. Due to the above handicaps, both of airplanes and helicopters, there are many suggestions to combine these two types of aircrafts, for example:

(a) To apply extension wings in the helicopter, in a way a telescope is extended, so that while ascending, the wings are shortened down and the craft operates as a helicopter with reduced vertical air drag due to shortened wings. On the other hand, when it should go ahead, its wings are extended out and an ordiary propeller begins to act as in any airplane. (See Fig. A.)

(b) The rotor or rotors acting whether as regular rotors when ascending, or as propeller when flying in a horizontal direction, in which case the rotor disks together with the wings to which they are attached, are swung around their horizontal axis for 90° from the helicopter position, i. e., the rotor disk moves into vertical plane and the wings move into horizontal planes. (See Fig. $B_a$ and Fig. $B_b$.)

(c) There are some other ideas, being more or less the combination of the above, or some variations, yet up to now the above ideas were not realized in practice due to being either unpractical or even sometimes theoretically wrong.

What I propose is:

In the drawing forming a part hereof, in which like reference characters indicate corresponding part in all the views.

Fig. A is a diagrammatic, perspective view showing a modified form of the invention; and Figs. $B_a$ and $B_b$ are diagrammatic, front elevations of a second modification of the invention.

Figure 1:
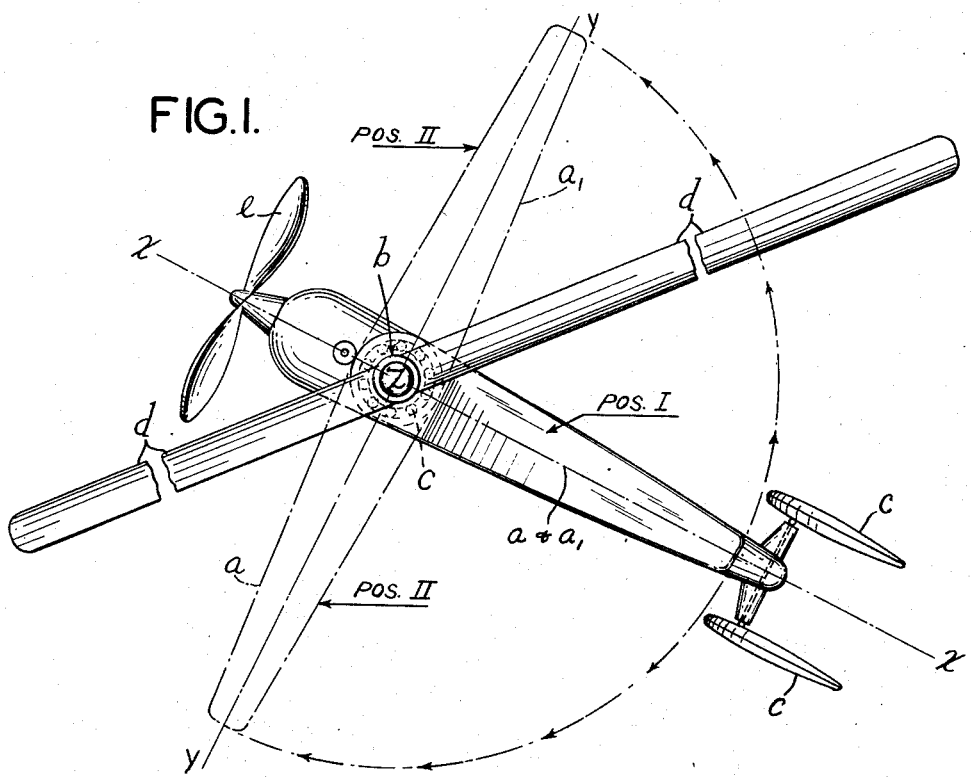
Fig. 1 is a diagrammatic top plan view of a convertible aircraft embodying this invention.

Fig. 1 shows in a sketch form a general view from the top of proposed "convertible craft" able to operate either as a helicopter or as an airplane, or simultaneously as both, having both: Rotor $d$ and propeller $e$.

On this sketch ($a$ and $a-1$) are wings which may swing around vertical axis Z from position I into position II and vice versa by means of special servo-motors control of which may be located in front of pilot. To perform this, it will require much less effort than it requires now for the change of pitch control of rotor blades during operation of the rotor, as no air-drag present in the last case is present in the former. The above swinging wings $a$ and $a-1$ are connected to pylon column $b$ by ball bearings $c$. The last two, $b$ and $c$ should be rather of larger diameters for strength. However, as the movements of weights and lifts of both wings are of opposite signs, the resultant bending movement on the pylon column, as balanced, will not be large.

Figure 2:
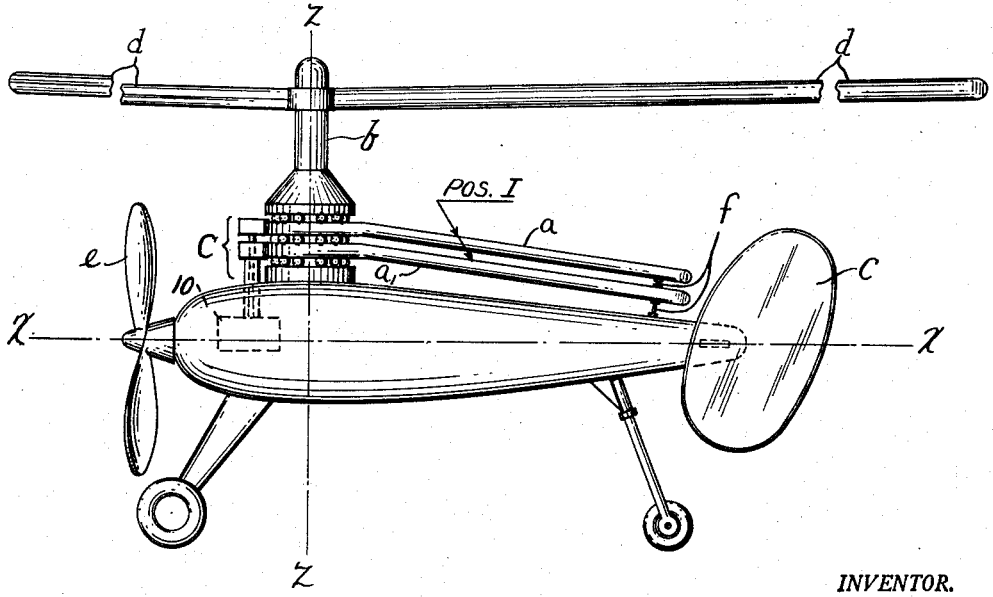
Fig. 2 is a side elevation of the aircraft shown in Fig. 1.

Suitable means, as shown at 10 in Figs. 1 and 2, are provided engaging the root of each wing $a$ and $a-1$ to change the fixed wing to various adjusted positions about the axis Z—Z.

In order to reduce the air-drag when ascending (while operating the craft as a helicopter), the swinging wings $a$ and $a-1$ should have their vertical projection as close as possible to the vertical projection of the fuselage of the craft from Z to its rudders $c$. (See Fig. 1, position I shaded.)

Fig. 2 shows how the wings $a$ and $a-1$ may look from the side view when craft is operating as a helicopter; $b$ is pylon; $d$ are blades of a rotor; $f$ are supports for wings.

From the above, the procedure as to how to use my convertible craft is self-evident.

When ascending, the wings are in position I of Fig. 1; the revolving rotor $d$ will ascend the craft to desirable elevation; to go forward the wings $a$ and $a-1$, while the craft is hovering, should be swung by means of servo-motors into position II and the rotor $d$—$d$ disconnected with the engine, mechanically or pneumatically depending whether we have helicopter or jet helicopter, and the engine connected to the shaft of a propeller $e$. It is quite possible that during a very short movement both the rotor and the propeller should be active at the same time. This will require two clutches individually connecting to the engine: (a) rotor or blower, on one hand, and (b) the propeller, on the other.

When descending the operation will be more or less opposite to the above operation; namely: reverse the pitch of propeller to stop the movement ahead; start the rotor; hover; swing the wings from position II into position I; descend as the helicopter usually does. While descending, the wings $a$ and $a-1$ may at all times, be in position II, increasing the vertical air drag. The last combination will give an additional safety factor when the engine is off and the pilot is making a forced landing.

In the case when each wing $a$ and $a-1$ can be swung separately and held in any position between I and II (see Fig. 1) then the craft, when acting as a helicopter, may have its rotor $d$—$d$ fixed perpendicular to the pylon $b$ for good (Fig. 2) thus avoiding the necessity of tilting the rotor disk independently of the rest of the helicopter, as is usually done now in order to move the craft in horizontal directions.

Figure 3:
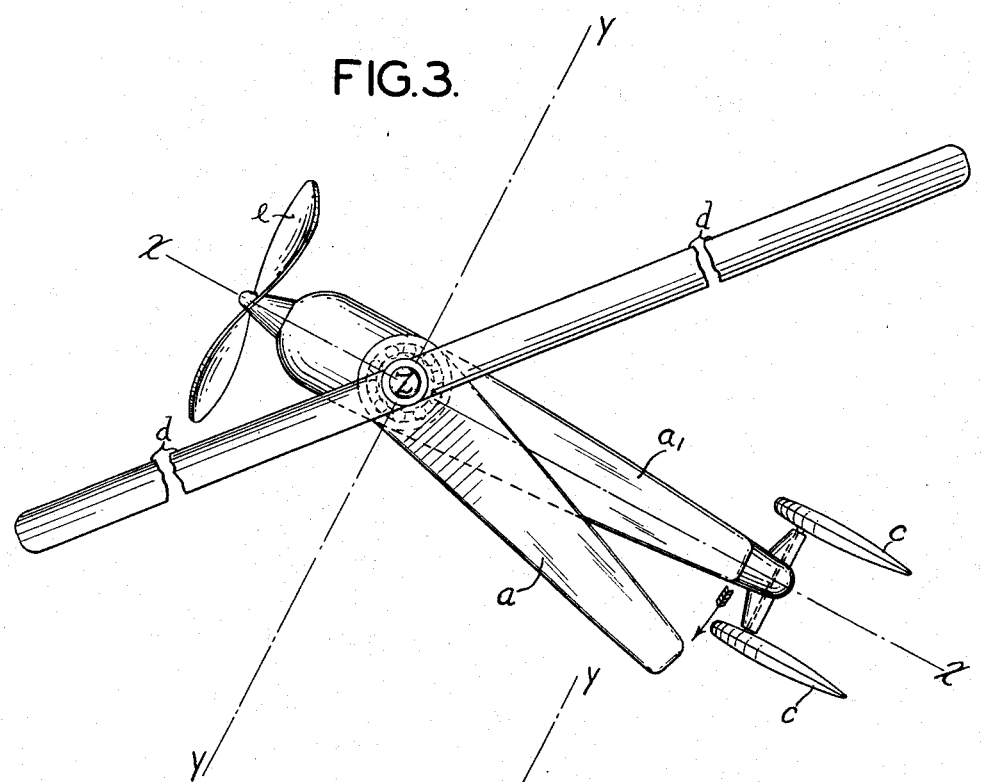
Figs. 3 and 4 are views similar to Fig. 1, but showing the folding wings in different positions.

In my invention the movements in a vertical cross-plane when the craft is acting as a helicopter (while having a rigid and constant angle of 90° between pylon $b$ and rotor disk) can be obtained when using the effect of displaced center of gravity of the craft (and also of the reaction of down-drift of rotor upon the surfaces of one of the wings) when one of the wings will be swung around by pilot for a few degrees in a horizontal plane, thus making an asymmetrical outline of the craft in plan (Fig. 3).

Figure 4:
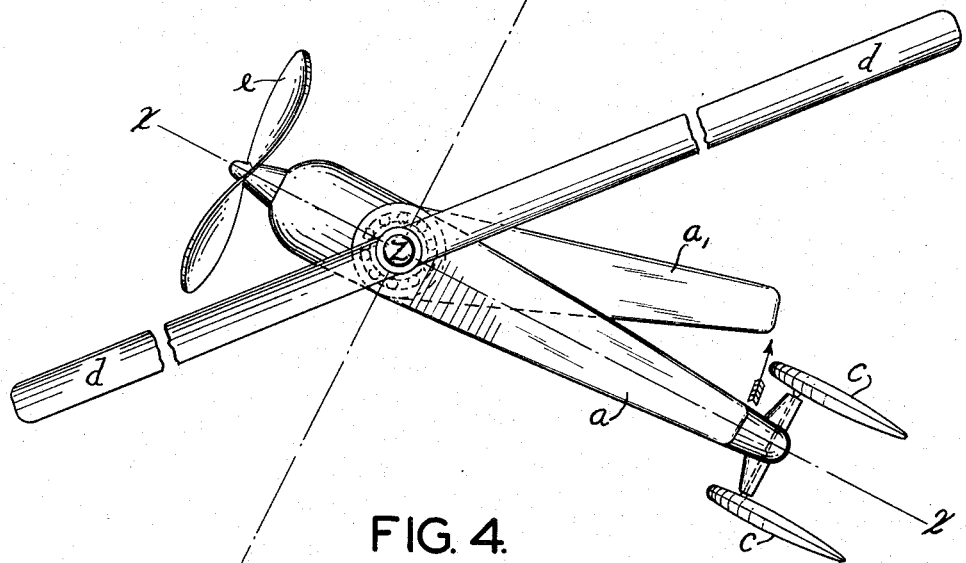

In the case shown (Fig. 3) the craft together with the rotor disk, due to displaced center of gravity and down-drift reaction, will tilt to the left, and the horizontal component of the inclined revolving rotor $d$—$d$ will pull it in the same direction, i. e. to the left. In order to move to the right, the wing $a$ should be in position I of Fig. 1, and the wing $a-1$ as shown in Fig. 4.

In order to move ahead or backwards, it is enough while hovering, to give the pull ahead by propeller or to reverse the pitch of the propeller and move backwards.

It is a known fact that any helicopter when moving in a horizontal direction has a tendency to tilt toward perpendicular to this direction. This is a result of the fact that forward moving blade has a stronger air-lift than the backward moving one. To avoid this, it is now used so called, "cumulative cycle pitch control" a very complicated device. Such complicated "cycle pitch control" nevertheless, can be avoided when applying my invention. For instance, in order to counteract against the above tilt it is enough to create an "opposite balancing tilt" by one of the above mentioned blade movements by means of swinging one of the wings. This will move the center of gravity of the craft for sufficient distance to balance the movement and to put the craft straight.

The control of the above movements can be arranged and so interlinked, that by moving a pilot-stick in any direction, the desirable movements of wings $a$ and/or $a-1$ as well as movement of propeller $e$ could be obtained, so that the craft will move in the same direction as does the pilot-stick.

From the above, one may see that while using my invention of swinging wings in a horizontal plane we will obtain not just a practical convertible aircraft but also (when using it as a helicopter) we will avoid the necessity when moving horizontally, of moving the rotor disk independently from the rest of the helicopter body, thus avoiding such very complicated and delicate parts as wobbling unit system, cumulative cycle pitch control system, and many other delicate devices connected with the above systems. All this will make the aircraft much simpler, lighter, easier to operate, and to repair (even in the field) and cheaper, than anything proposed up to now, on convertible craft.

Taking all the above into consideration, what I claim as my invention is:

1. A combination helicopter and airplane comprising a fuselage, a pylon extending upwardly from the fuselage, a sustaining rotor at the upper end of the pylon and connected with power means within the fuselage, two wings having horizontally projecting areas of chordwise extent not greater than the width of the fuselage, each of said wings being located below the rotor and above the fuselage and at somewhat different heights above the fuselage, bearings connecting the wings to the pylon, said bearings being movable to shift the wings from positions extending transversely outward from the fuselage to folded positions above the fuselage with one wing located over the other, and a propeller connected with the fuselage, for driving the combined helicopter and airplane in forward flight.

2. A flying machine comprising a fuselage with a pylon extending upwardly therefrom, a bearing at the upper end of the pylon in fixed, angular relation to the longitudinal axis of the fuselage, a sustaining rotor that rotates on said bearing, two wings connected to the pylon and each movable above the pylon from positions in which they extend transversely of the fuselage to horizontal positions in which they extend rearwardly above the fuselage, and a propeller that drives the flying machine in forward flight.

3. A flying machine comprising a fuselage with a pylon extending upwardly therefrom, a sustaining rotor connected with the upper end of the pylon, and a pair of wings connected to the pylon at slightly different levels on the pylon between the fuselage and the rotor, said wings being movable about their connections to the pylon between extended positions transverse of the fuselage and retracted positions extending rearwardly along the top of the fuselage.

4. A flying machine comprising a fuselage, a pylon connected to the fuselage and having an axis extending upwardly from the fuselage, a sustaining rotor rotatably connected to the pylon, and two wings connected to the pylon and each of which is independently movable on a bearing on the pylon about the axis of the pylon between an extended position transverse of the fuselage and a retracted position located above the fuselage, each of the wings being located at a different level between the fuselage and the rotor and having a projecting area on the fuselage within the transverse and longitudinal limits of the fuselage.

References Cited in the file of this patent

UNITED STATES PATENTS

| Number | Name | Date |
|--------|------|------|
| 1,622,191 | Filippi | Mar. 22, 1927 |
| 1,859,716 | Rutrle | May 24, 1932 |

FOREIGN PATENTS

| Number | Country | Date |
|--------|---------|------|
| 816,813 | France | May 10, 1937 |